(12) United States Patent
Lee

(10) Patent No.: US 10,840,588 B2
(45) Date of Patent: Nov. 17, 2020

(54) VEHICLE

(71) Applicants: HYUNDAI MOTOR COMPANY, Seoul (KR); KIA MOTORS CORPORATION, Seoul (KR)

(72) Inventor: Byoung Hyun Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/377,645

(22) Filed: Apr. 8, 2019

(65) Prior Publication Data

US 2020/0127371 A1  Apr. 23, 2020

(30) Foreign Application Priority Data

Oct. 23, 2018 (KR) .......................... 10-2018-0126969

(51) Int. Cl.
*H01Q 1/32* (2006.01)
*B60R 11/00* (2006.01)

(52) U.S. Cl.
CPC .......... *H01Q 1/3291* (2013.01); *H01Q 1/3275* (2013.01); *B60R 2011/0028* (2013.01); *B60R 2011/0052* (2013.01)

(58) Field of Classification Search
CPC ....... H01Q 1/3275; H01Q 1/3291; H01Q 1/32
See application file for complete search history.

(56) References Cited

U.S. PATENT DOCUMENTS

| | | | |
|---|---|---|---|
| 6,433,749 B1* | 8/2002 | Thompson | H01Q 1/1271 343/700 MS |
| 6,624,794 B1* | 9/2003 | Wendt | H01Q 1/1271 343/713 |
| 2006/0017631 A1* | 1/2006 | Schon | H01Q 21/30 343/713 |
| 2011/0068983 A1* | 3/2011 | Koide | H01Q 1/38 343/700 MS |

* cited by examiner

*Primary Examiner* — Hoang V Nguyen
(74) *Attorney, Agent, or Firm* — Morgan, Lewis & Bockius LLP

(57) ABSTRACT

A vehicle may include a roof, a glass mounted on a rear end portion of the roof and having a black coating region on a portion of the glass adjacent to the rear end portion of the roof, a rear rail mounted on a lower portion of the rear end portion of the roof, and an antenna mounted on the rear rail to be positioned below the black coating region.

12 Claims, 6 Drawing Sheets

VEHICLE

CROSS-REFERENCE TO RELATED APPLICATION(S)

The present application claims priority to Korean Patent Application No. 10-2018-0126969, filed on Oct. 23, 2018 in the Korean Intellectual Property Office, the entire contents of which is incorporated herein for all purposes by this reference.

BACKGROUND OF THE INVENTION

Field of the Invention

The present invention relates to a vehicle having an antenna mounted therein so as not to be exposed to the outside.

Description of Related Art

Generally, an antenna for receiving or transmitting radio waves is provided outside a vehicle.

The antenna is disposed outside the vehicle to receive or transmit radio waves. A hole is formed on a portion of a roof for mounting the antenna outside the vehicle, and the antenna is disposed on the roof to be externally exposed through the hole.

For the antenna to receive or transmit radio waves, there may be no metallic material in the directions in which the radio waves are received or transmitted, and thus the hole is formed in the roof so that the antenna may be disposed to be exposed to the outside.

As described above, since the hole is formed on the roof to install the antenna, moisture may be infiltrated through the hole formed on the roof.

Furthermore, since the antenna protrudes outside the roof of the vehicle, the aesthetics of the vehicle may deteriorate.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle having an antenna mounted therein so as not to be exposed to the outside.

Additional various aspects of the present invention will be set forth in part in the description which follows and, in part, will be obvious from the description, or may be learned by practice of the present invention.

In accordance with an aspect of the present invention, a vehicle may include a roof, a glass mounted on a rear end portion of the roof and having a black coating region on a portion of the glass adjacent to the rear end portion of the roof, a rear rail mounted on a lower portion of the rear end portion of the roof, and an antenna mounted on the rear rail to be positioned below the black coating region.

The antenna may be positioned below the black coating region to prevent exposure to the outside of the vehicle and emit a signal to the outside.

The rear rail may include an antenna mounting portion on which the antenna is mounted.

The antenna mounting portion may include a center clip on which the antenna is provisionally mounted, a rotation preventing hole for preventing rotation of the antenna provisionally mounted on the center clip, and a first mounting hole for mounting the antenna.

The antenna may include a coupling portion provisionally coupled to the center clip, a rotation preventing protrusion inserted into the rotation preventing hole to prevent rotation of the antenna, and a second mounting hole provided at a position corresponding to the first mounting hole and mounted to the first mounting hole by the bolt.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
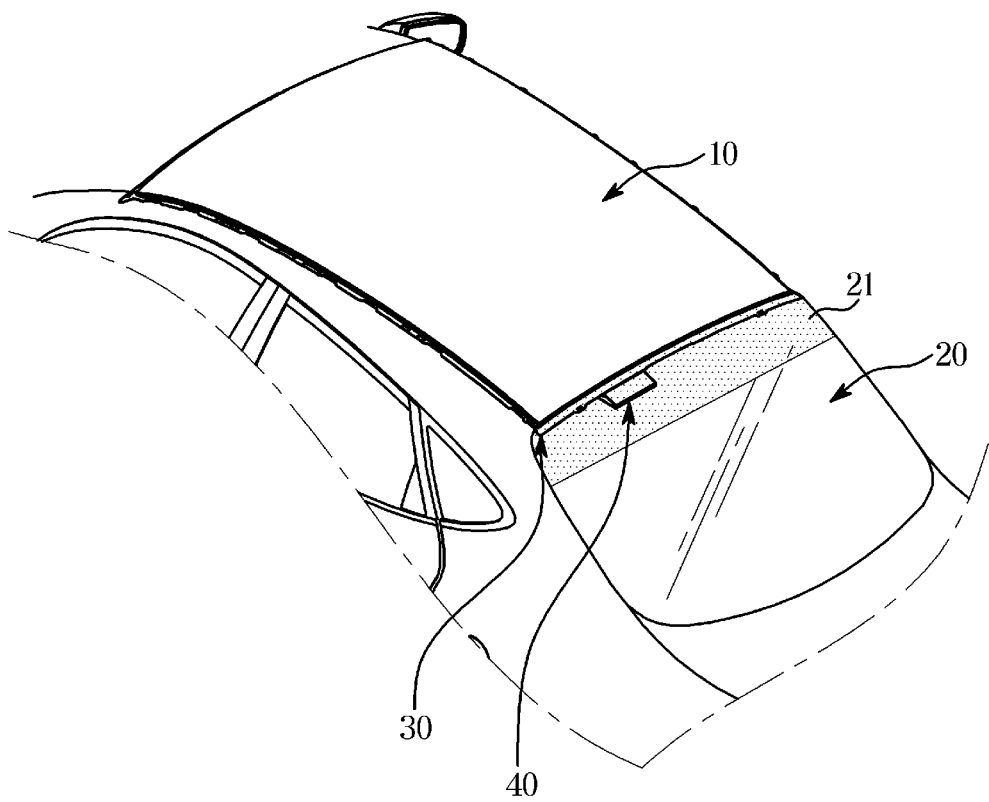
FIG. 1 is a view schematically illustrating a portion of a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The exemplary embodiments described herein and the configurations shown in the drawings are only examples of exemplary embodiments of the present invention, and various modifications may be made at the time of filing of the present invention to replace the exemplary embodiments and drawings of the present embodiment.

Like reference numbers or designations in the various figures of the present invention represent parts or components that perform substantially the same functions.

The terms used herein are for describing the exemplary embodiments and are not intended to restrict and/or to limit the present invention. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms "first," "second," etc. may be used herein to describe various components, these components should not be limited by these terms. These terms are only used to distinguish one component from another. For example, without departing from the scope of the present invention, the first component may be referred to as a second component, and similarly, the second component may also be referred to as a first component. The term "and/or" includes any combination of a plurality of related items or any one of a plurality of related items.

In the exemplary embodiment, the terms "front," "rear," "upper," "lower," "left," and "right" are defined with reference to the drawings, and the shape and position of each component are not limited by these terms.

Hereinafter, embodiments according to an exemplary embodiment of the present invention will be described in detail with reference to the accompanying drawings.

Figure 2:
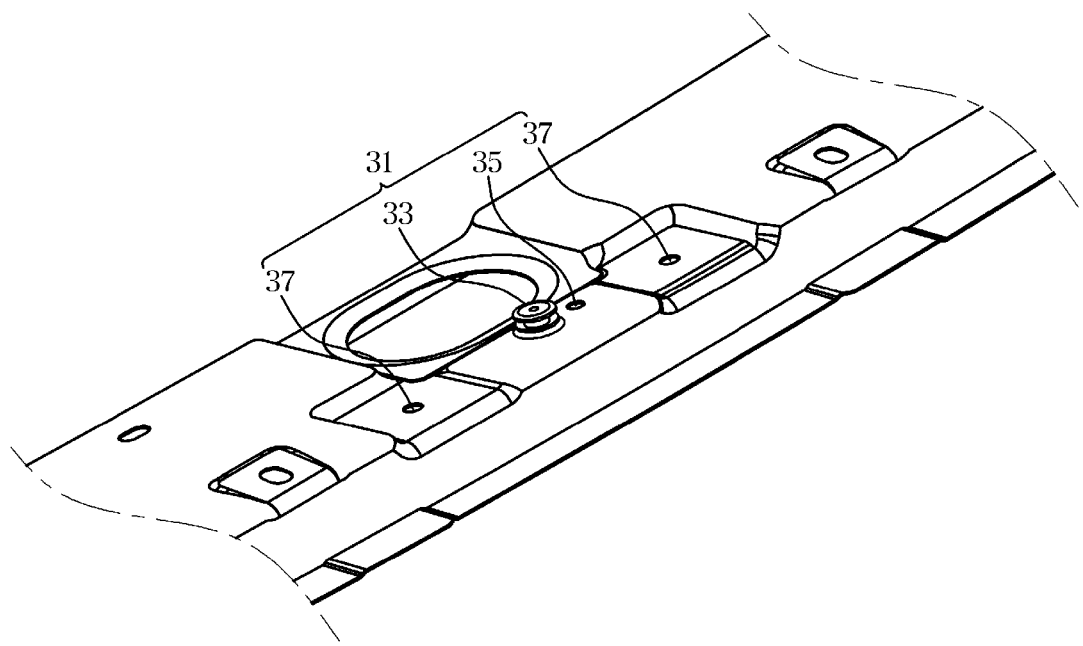
FIG. 2 is a view exemplarily illustrating a rear rail according to an exemplary embodiment of the present invention with a lower surface facing upward.
Figure 3:
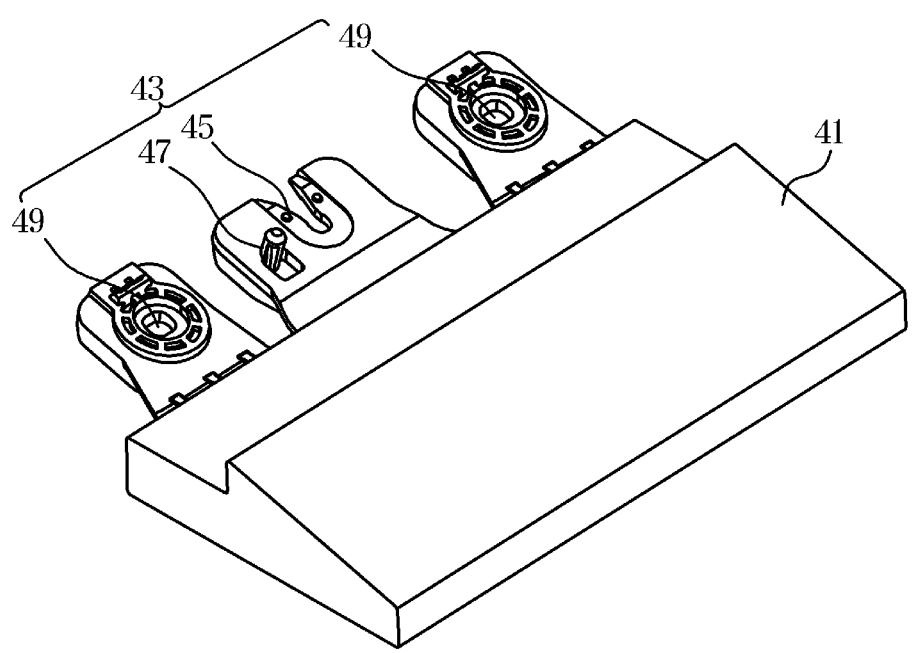
FIG. 3 is a view exemplarily illustrating an antenna according to an exemplary embodiment of the present invention facing upward.

FIG. 1 is a view schematically illustrating a portion of a vehicle according to an exemplary embodiment of the present invention, FIG. 2 is a view exemplarily illustrating a rear rail according to an exemplary embodiment of the present invention with a lower surface facing upward, and FIG. 3 is a view exemplarily illustrating an antenna according to an exemplary embodiment of the present invention facing upward.

Referring to FIG. 1, FIG. 2, and FIG. 3, a vehicle may include a roof 10, a transparent glass 20 mounted on a rear end portion of the roof 10, a rear rail 30 mounted on a lower portion of the rear end portion of the roof 10, and an antenna 40 mounted on the rear rail 30.

The glass 20 mounted on the rear end portion of the roof 10 may include a black coating region 21 provided at a portion adjacent to the rear end portion of the roof 10.

The rear rail 30 mounted on the lower portion of the rear end portion of the roof 10 may include an antenna mounting portion 31 on which the antenna 40 is mounted.

The antenna mounting portion 31 may be mounted on a lower surface of the rear rail 30.

The antenna mounting portion 31 may include a center clip 33 on which the antenna 40 is provisionally mounted, a rotation preventing hole 35 into which a rotation preventing protrusion 47 of the antenna 40, which will be described later, for preventing rotation of the antenna 40 provisionally mounted on the center clip 33 is inserted, and at least one first mounting hole 37 in which the antenna 40 is mounted by at least one bolt B (refer to FIG. 6).

Although the drawings illustrate that the first mounting holes 37 are mounted on the left and right sides of the center clip 33, the present invention is not limited thereto.

Since the antenna mounting portion 31 on which the antenna 40 is mounted is mounted on the rear rail 30, a separate structure for mounting the antenna 40 is not required, so that the existing structure of a vehicle may be maintained as it is and the antenna 40 may be easily mounted.

The antenna 40 may be mounted on the antenna mounting portion 31 mounted on the lower surface of the rear rail 30.

The antenna 40 may include a case 41 and a mounted portion 43 which is mounted on the antenna mounting portion 31.

Although not shown in the drawings, a plurality of parts may be provided inside the case 41.

The mounted portion 43 may be provided to protrude from one side of the case 41 so that an upper surface of the case 41 is prevented from being covered by the rear rail 30 when the mounted portion 43 of the antenna 40 is mounted on the antenna mounting portion 31 of the rear rail 30.

The mounted portion 43 of the antenna 40 may include a coupling portion 45 provisionally coupled to the center clip 33 of the antenna mounting portion 31, the rotation preventing protrusion 47 inserted into the rotation preventing hole 35 to prevent rotation of the antenna 40, and at least one second mounting hole 49 on which the antenna mounting portion 31 is mounted by the at least one bolt B.

In an exemplary embodiment of the present invention, the coupling portion 45 includes a groove having an open side and the center clip 33 is in a shape of "T" in cross section and the groove of the coupling portion 45 can be coupled to the center clip 33 through the open side of the groove.

The antenna 40 may be mounted on the antenna mounting portion 31 by the bolt B after the coupling portion 45 is provisionally coupled to the center clip 33.

When the coupling portion 45 of the antenna 40 is provisionally coupled to the center clip 33, the antenna 40 may be rotated about the center clip 33 as an axis.

The first mounting hole 37 of the antenna mounting portion 31 and the second mounting hole 49 of the mounted portion 43 may not be aligned with each other when the antenna 40 is rotated, and thus the mounted portion 43 may be provided with the rotation preventing protrusion 47 for preventing rotation of the antenna 40.

When the rotation preventing protrusion 47 positioned offset from the center clip 33 is inserted into the rotation preventing hole 35 after the coupling portion 45 of the antenna 40 is provisionally coupled to the center clip 33, the rotation of the antenna 40 may be prevented.

Although the drawings illustrate that the second mounting holes 49 are mounted on the left and right sides of the coupling portion 45 to correspond to the number of the first mounting holes 37, the present invention is not limited thereto. That is, the number of the second mounting holes 49 may vary depending on the number of the first mounting holes 37.

Since the upper surface of the case 41 is not covered by the rear rail 30 when the antenna mounting portion 31 is mounted on the lower surface of the rear rail 30 and the antenna 40 is mounted on the antenna mounting portion 31, the case 41 may be positioned below the glass 20.

Accordingly, since the antenna 40 is placed below the glass 20, which is not a metal material, in a state in which the antenna 40 is mounted inside the vehicle, the antenna 40 may emit a signal to the outside of the vehicle.

Furthermore, since the antenna 40 is concealed in the internal of the vehicle, the design inherent in the vehicle may be maintained as it is, and the problem of watertightness may not occur.

As described above, since the antenna 40 is structured not to be bonded to the glass 20 by an adhesive such as glue but to be mounted on the rear rail 30 and positioned below the glass 20, the antenna 40 may be excellent in the ease of assembly and reliability.

The black coating region 21 is mounted on a portion of the glass 20 adjacent to the roof 10 and the case 41 of the antenna 40 may be positioned below the black coating region 21 of the glass 20.

Accordingly, the antenna 40 is positioned below the glass 20 which is not a metal material to emit a signal to the outside of the vehicle and may be prevented from being externally exposed by the black coating region 21.

Hereinafter, a method of mounting the antenna 40 to the rear rail 30 will be described with reference to FIG. 4, FIG. 5 and FIG. 6.

Figure 4:
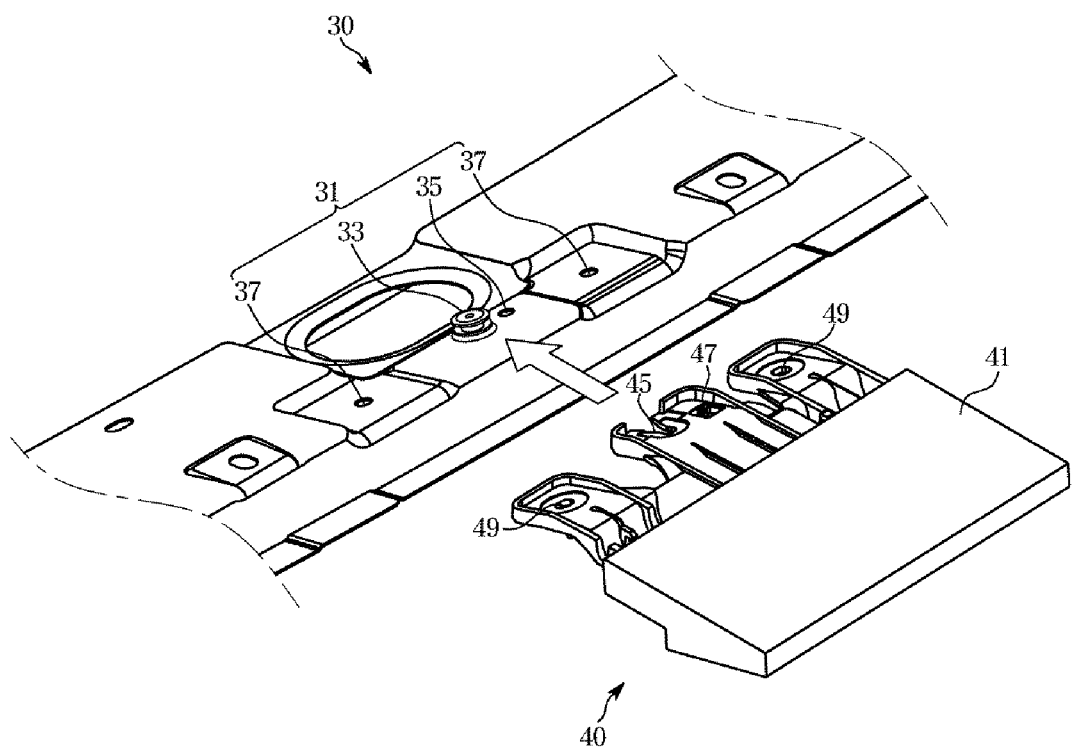
FIG. 4 illustrates that a mounted portion of an antenna according to an exemplary embodiment of the present invention is provisionally mounted on a center clip of a rear rail.
Figure 5:
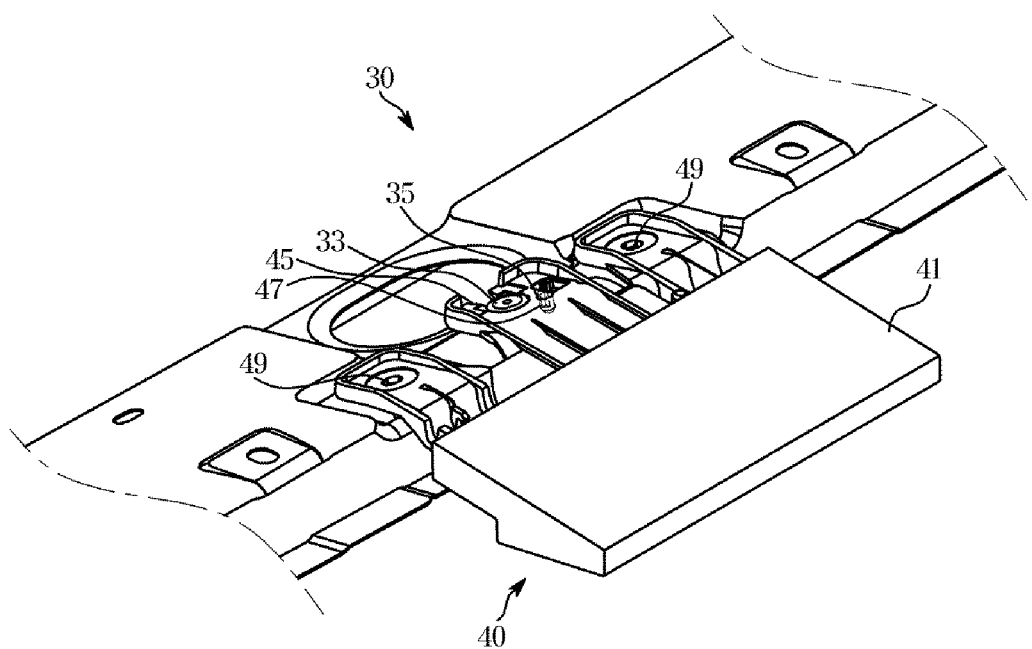
FIG. 5 illustrates that a rotation preventing protrusion of an antenna according to an exemplary embodiment of the present invention is inserted into a rotation preventing hole of a rear rail.
Figure 6:
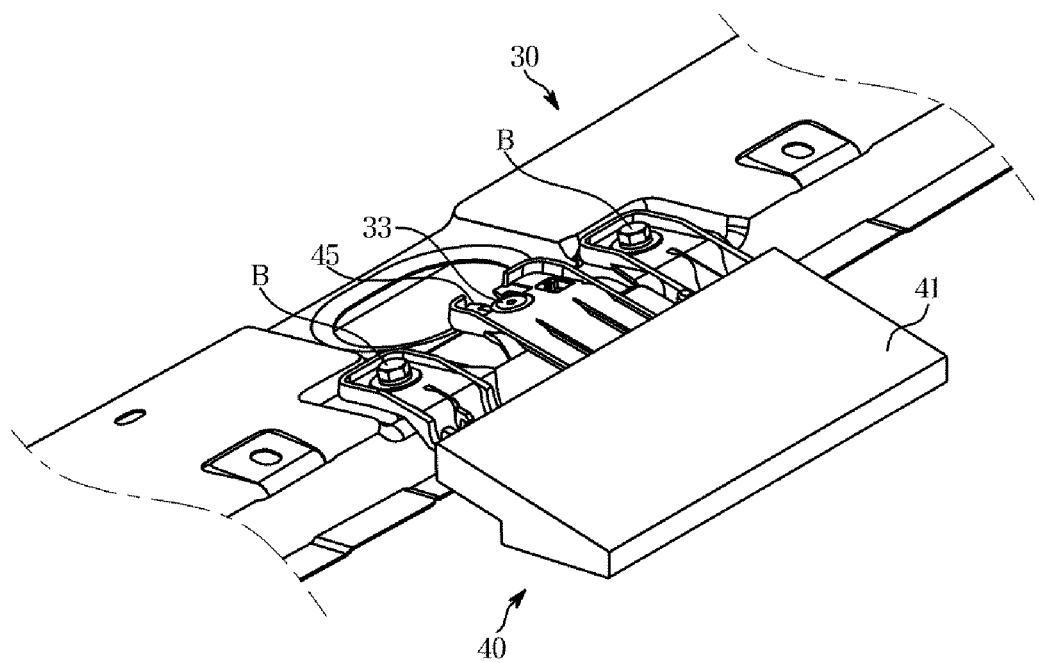
FIG. 6 illustrates that an antenna according to an exemplary embodiment of the present invention is mounted on a rear rail by bolts.

FIG. 4 illustrates that a mounted portion of an antenna according to an exemplary embodiment of the present invention is provisionally mounted on a center clip of a rear rail, FIG. 5 illustrates that a rotation preventing protrusion of an antenna according to an exemplary embodiment of the present invention is inserted into a rotation preventing hole of a rear rail, and FIG. 6 illustrates that an antenna according to an exemplary embodiment of the present invention is mounted on a rear rail by bolts.

FIG. 4, FIG. 5 and FIG. 6 illustrate that the lower surface of the rear rail faces upward to clearly show the process of mounting the antenna on the rear rail.

As illustrated in FIG. 4, the antenna 40 may be first moved in the direction of the arrow shown in the drawing so that the coupling portion 45 of the antenna 40 is coupled to the center clip 33 of the rear rail 30, so that the antenna 40 may be provisionally mounted on the rear rail 30.

When the antenna 40 is provisionally mounted on the rear rail 30, the first mounting hole 37 of the rear rail 30 and the second mounting hole 49 of the antenna 40 are positioned to be aligned, so that the antenna 40 may be easily mounted on the rear rail 30 by the bolts B.

When the antenna 40 is provisionally mounted on the rear rail 30, as illustrated in FIG. 5, the rotation preventing protrusion 47 may be inserted into the rotation preventing hole 35 to prevent the antenna 40 from being rotated.

When the rotation of the antenna 40 is prevented, the first mounting hole 37 of the rear rail 30 and the second mounting hole 49 of the antenna 40 may be positioned to be aligned more easily.

When the first mounting hole 37 of the rear rail 30 and the second mounting hole 49 of the antenna 40 are positioned to be aligned, as illustrated in FIG. 6, the bolts B are inserted into the second mounting hole 49 and the first mounting hole 37 so that the antenna 40 may be mounted on the rear rail 30.

As is apparent from the above, according to an exemplary embodiment of the present invention, the antenna may be mounted within the vehicle to prevent the antenna from being exposed to the outside, so that the design inherent in the vehicle may be maintained as it is.

Furthermore, according to an exemplary embodiment of the present invention, the problem of watertightness cannot occur because the antenna is mounted inside the vehicle, and the material cost may be reduced because a separate structure for mounting is not necessary.

Furthermore, according to an exemplary embodiment of the present invention, the ease of assembly and reliability may be excellent because the antenna is in close contact with the glass but is not attached to the glass.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle comprising:
   a roof;
   a glass mounted on a rear end portion of the roof and having a coating region on a portion of the glass adjacent to the rear end portion of the roof;
   a rear rail mounted on a lower portion in the rear end portion of the roof; and
   an antenna mounted on the rear rail to be positioned below the coating region,
   wherein the antenna is positioned below the coating region of the glass inside the vehicle to prevent exposure thereof to an outside of the vehicle and emit a signal to the outside.

2. The vehicle of claim 1,
   wherein the rear rail includes an antenna mounting portion on which the antenna is configured to be mounted.

3. The vehicle of claim 2, wherein the antenna mourning portion includes:
   a center clip on which the antenna is configured to be mounted;
   a rotation preventing hole offset from the center clip and preventing a rotation of the antenna mounted on the center clip; and
   a first mounting hole for mounting the antenna.

4. The vehicle of claim 3, wherein the antenna includes:
   a coupling portion configured to be coupled to the center clip;
   a rotation preventing protrusion inserted into the rotation preventing hole to prevent the rotation of the antenna while the coupling portion is coupled to the center clip.

5. The vehicle of claim 4, wherein the antenna further includes a second mounting hole provided at a position of the antenna corresponding to the first mounting hole and mounted to the first mounting hole by a fastener while the coupling portion is coupled to the center clip and the rotation preventing protrusion is coupled to the rotation preventing hole.

6. The vehicle of claim 4, wherein the coupling portion includes a groove having an open portion and the center clip has a cross section in a shape of "T" so that the groove of the coupling portion is coupled to the center clip through the open portion.

7. The vehicle of claim 3, wherein the rotation preventing hole is positioned between the center clip and the first mounting hole.

8. An antenna mounting apparatus comprising:
a rear rail configured to be mounted on a lower portion of a rear end portion in a roof in a vehicle; and
an antenna configured to be mounted on the rear rail to be positioned below a coating region of a glass of the vehicle inside the vehicle,
wherein the rear rail includes an antenna mounting portion on which the antenna is configured to be mounted, and
wherein the antenna mounting portion includes:
a center clip on which the antenna is mounted;
a rotation preventing hole offset from the center clip and preventing a rotation of the antenna mounted on the center clip; and
a first mounting hole for mounting the antenna.

9. The antenna mounting apparatus of claim 8, wherein the antenna includes:
a coupling portion configured to be coupled to the center clip;
a rotation preventing protrusion inserted into the rotation preventing hole to prevent the rotation of the antenna while the coupling portion is coupled to the center clip.

10. The antenna mounting apparatus of claim 9, wherein the antenna further includes a second mounting hole provided at a position of the antenna corresponding to the first mounting hole and mounted to the first mounting hole by a fastener while the coupling portion is coupled to the center clip and the rotation preventing protrusion is coupled to the rotation preventing hole.

11. The antenna mounting apparatus of claim 9, wherein the coupling portion includes a groove having an open portion and the center clip has a cross section in a shape of "T" so that the groove of the coupling portion is coupled to the center clip through the open portion.

12. The antenna mounting apparatus of claim 8, wherein the rotation preventing hole is positioned between the center clip and the first mounting hole.

* * * * *